United States Patent
Huang et al.

(10) Patent No.: US 6,549,991 B1
(45) Date of Patent: Apr. 15, 2003

(54) PIPELINED SDRAM MEMORY CONTROLLER TO OPTIMIZE BUS UTILIZATION

(75) Inventors: Po-Wei Huang, Hsin Chu (TW); Ming-Hsien Lee, Hsin Chu (TW); Hui-Neng Chang, Tao Yuan (TW); Chao-Yu Chen, San Chung (TW); Sui-Hsin Chu, Taipei (TW)

(73) Assignee: Silicon Integrated Systems Corp. (TW)

( * ) Notice: Subject to any disclaimer, the term of this patent is extended or adjusted under 35 U.S.C. 154(b) by 291 days.

(21) Appl. No.: 09/653,516

(22) Filed: Aug. 31, 2000

(51) Int. Cl.[7] .............................................. G06F 12/00
(52) U.S. Cl. ..................... 711/158; 711/105; 711/169
(58) Field of Search ........................ 711/104–105, 158, 711/167–169

(56) References Cited

U.S. PATENT DOCUMENTS

| | | | | |
|---|---|---|---|---|
| 5,918,242 A | * | 6/1999 | Sarma et al. ................ | 711/105 |
| 6,295,586 B1 | * | 9/2001 | Novak et al. ................ | 365/203 |
| 6,385,708 B1 | * | 5/2002 | Stracovsky et al. ......... | 709/103 |

* cited by examiner

Primary Examiner—Matthew Kim
Assistant Examiner—Woo H. Choi
(74) Attorney, Agent, or Firm—Martine & Penilla, LLP (57) ABSTRACT

All memory commands are classified into two categories: background commands and foreground commands, depending on whether they are data related or not. The pointed background command and foreground commands are issued onto the DRAM bus at the earliest time when the required constrains are met. The background and foreground FSM controllers work in a pipelined or overlapped manner.

6 Claims, 6 Drawing Sheets

PIPELINED SDRAM MEMORY CONTROLLER TO OPTIMIZE BUS UTILIZATION

BACKGROUND OF THE INVENTION

A. Field of the Invention

The present invention relates to a memory controller to access the memory, and more particularly to a method and apparatus providing pipelined SDRAM access to maximize bus utilization in a highly integrated system.

B. Description of the Related Art

The computer systems are becoming ever more powerful by the day and the computer speeds dramatically increased recently. As the VLSI technology is moving to high densities of integration, system on chip (S.O.C.) becomes a possible design methodology. For example, the chipset in a personal computer system may integrate north-bridge and VGA function into single chip using share memory architecture, north bridge and VGA using unique system memory together. In such application, the memory subsystem is accessed by multiple tasks (CPU requests and VGA requests) and operated in multitasking mode. Apparently, the memory data throughput dominates overall system performance.

Most DRAMs support various access modes including, for example, page mode as well as various high-speed refresh and pre-charge mechanisms. Essentially, page mode and static-column mode help to minimize wait states (i.e. times at which the CPU is suspended to allow the memory to catch up with the CPU). Another technique for minimizing wait states is to separate the DRAM into multi-banks. SDRAM has one important feature which supports random read/write access, the bank can be activated while another bank is being accessed, i.e. multi-bank ping-pong access.

Figure 1:
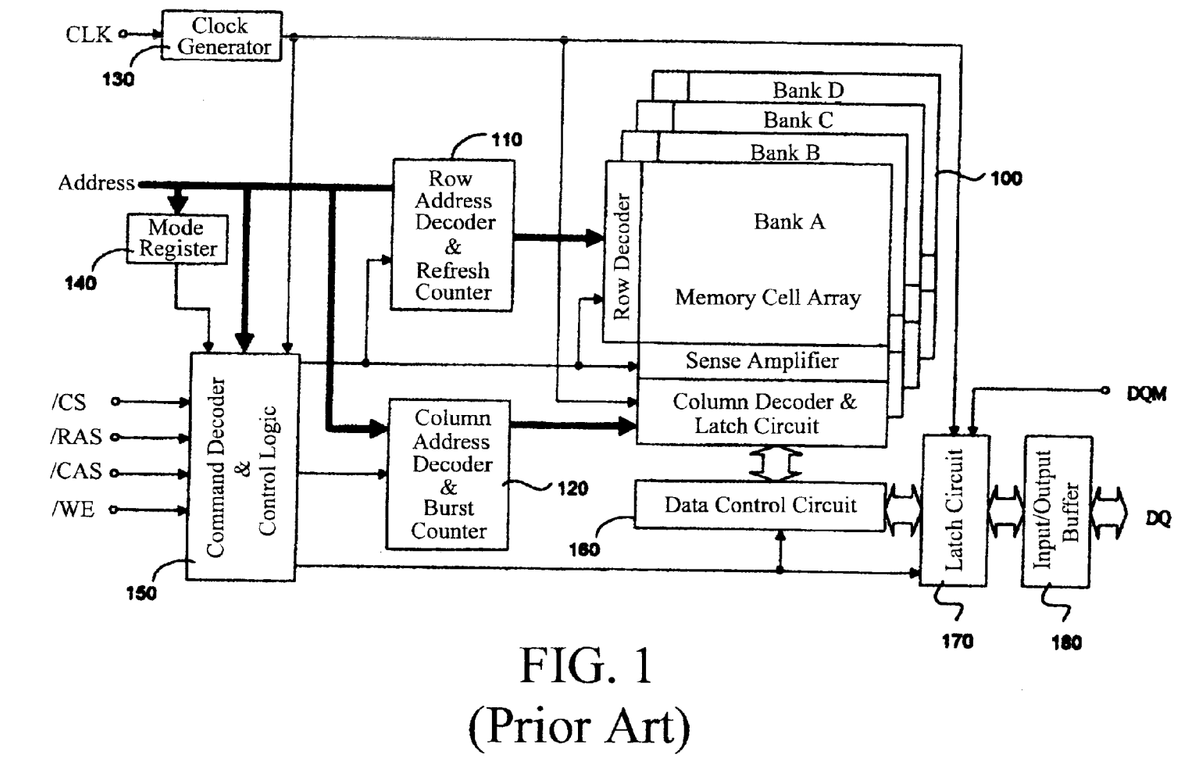
FIG. 1 is a block diagram shows the typical SDRAM architecture.

In typical SDRAM configuration and feature, the typical block diagram of conventional SDRAM is illustrated in FIG. 1. The central part of the SDRAM is the memory cell array 100, and typically, there are two or four memory cell arrays (called bank) in one SDRAM chip. A bit is stored in an individually addressable unit memory cell, which is arranged together with row address and column address in a specific bank. Therefore, memory address provided by memory controller received from CPU or VGA memory request is divided into two parts, a row address and a column address. Row address decoder 110 and column address decoder 120 are used to decode corresponding addresses. These two addresses are read into row address buffer and column address buffer on the assertion of /RAS and /CAS signals.

All memory commands are referred to the rising edge of clock from clock generator 130 when /CS signal is asserted and defined by the status of /RAS, /CAS and /WE signals. Command decoder and control logic 150 manages proper operation to each internal block based on the mode register 140 status and the input memory command. The operation mode, /CAS latency, burst type and burst length are defined by mode register set (MRS) command during DRAM initialization sequence.

For a memory read access, Data control circuit 160 outputs the stored data from addressed memory cell array 100; therefore, the sense amplifier amplifies the data and transfers them into the input/output buffer 180 based on latch circuit 170 which is determined by /DQM signal. Then the buffer supplies data onto the data bus via data pins. For a memory write access, data was latched into input/output buffer from data bus according to /DQM, then amplified by sense amplifier and transferred to the addressed memory cell array and stored.

From the behavior of SDRAM, we could conclude that a basic memory controller carries out three jobs: decoding the address from CPU or VGA memory requests into a row and a column address, activating control signals (/CS, /RAS, /CAS, /WE, /DQM) correctly, and transferring write data and accepting read data.

Depended on design, there are many ways to control SDRAM. For example, after a memory access is completed, whether precharging this activated page or not will affect the control manner. An activated page is that an addressed row already completed the activate command (ACT) and stayed at row active state waiting for read/write command. Whenever performing pre-charge to this page, any subsequent memory access must issue activate command before issue read/write command even when they are located on the same page. On the other hand, if this page still stays on activated state, we can save the activating time when the subsequent access is a hit cycle. A hit cycle is that the current memory access located on an activated page. However, there is penalty if the following is a miss cycle since we have to pre-charge activated page first then activate desired page. A miss cycle, conversely, is current memory cycle located on the same bank but a different row from the activated page. In addition, there is also a row empty cycle that is a memory access cycle locates on the bank whose rows are all at idle state. For a row empty cycle, the target page has to be activated first before issuing a RD/WRT command.

One important feature of SDRAM to improve the data bandwidth is SDRAM supports random row read/write access; that is multi-bank Ping-Pong access. It means that a bank can be activated or pre-charged while another bank is being accessed. By this feature, we can infer that under the avoidance of conflict on command bus and data bus, we can pipelined or overlapped issue commands to different banks to utilize bus more efficient. It is a predominant factor to improve memory access performance because data bandwidth depends heavily on the utilization of data bus.

SUMMARY OF THE INVENTION

In a highly integrated system, memory subsystem may be accessed by multiple devices and operated in multitasking mode. Thus, the present invention provides a pipelined method and apparatus for optimized DRAM bus utilization to gain maximum data bandwidth.

After receiving a memory access request, memory request priority arbitration unit determines which request could be granted, then corresponding memory commands are generated depended on current SDRAM internal status. Depending on commands' characteristics, all these commands are divided into background commands and foreground commands then pushed into background queue and foreground queue respectively. Foreground commands include memory read and write commands that concerned with data transfer. Background commands are the other SDRAM commands for initialization, refresh and read/write preliminaries such as pre-charge and activate commands. When a being consumed command in queues satisfies all required conditions, this command is issued onto DRAM bus at earliest allowable time. Since background commands are not data related, they could be issued during the interval that data bus is busy but command bus is free; that is background commands can be overlapped with foreground commands. Therefore, through applying background queue and foreground queue, we can issue memory commands pipelined onto DRAM bus to gain maximum bus utilization. Under best case, background accesses could be hide under foreground accesses and DRAM bus is always doing data transfer. Moreover, this invention can work well not only on conventional SDRAM but also on current mainstream DRAM product such as conventional SDRAM, VC SDRAM and DDR SDRAM.

BRIEF DESCRIPTION OF THE DRAWINGS

These and other objects and advantages of the present invention will become apparent by reference to the following description and accompanying drawings wherein.

DETAIL DESCRIPTION OF THE INVENTION

Figure 2:
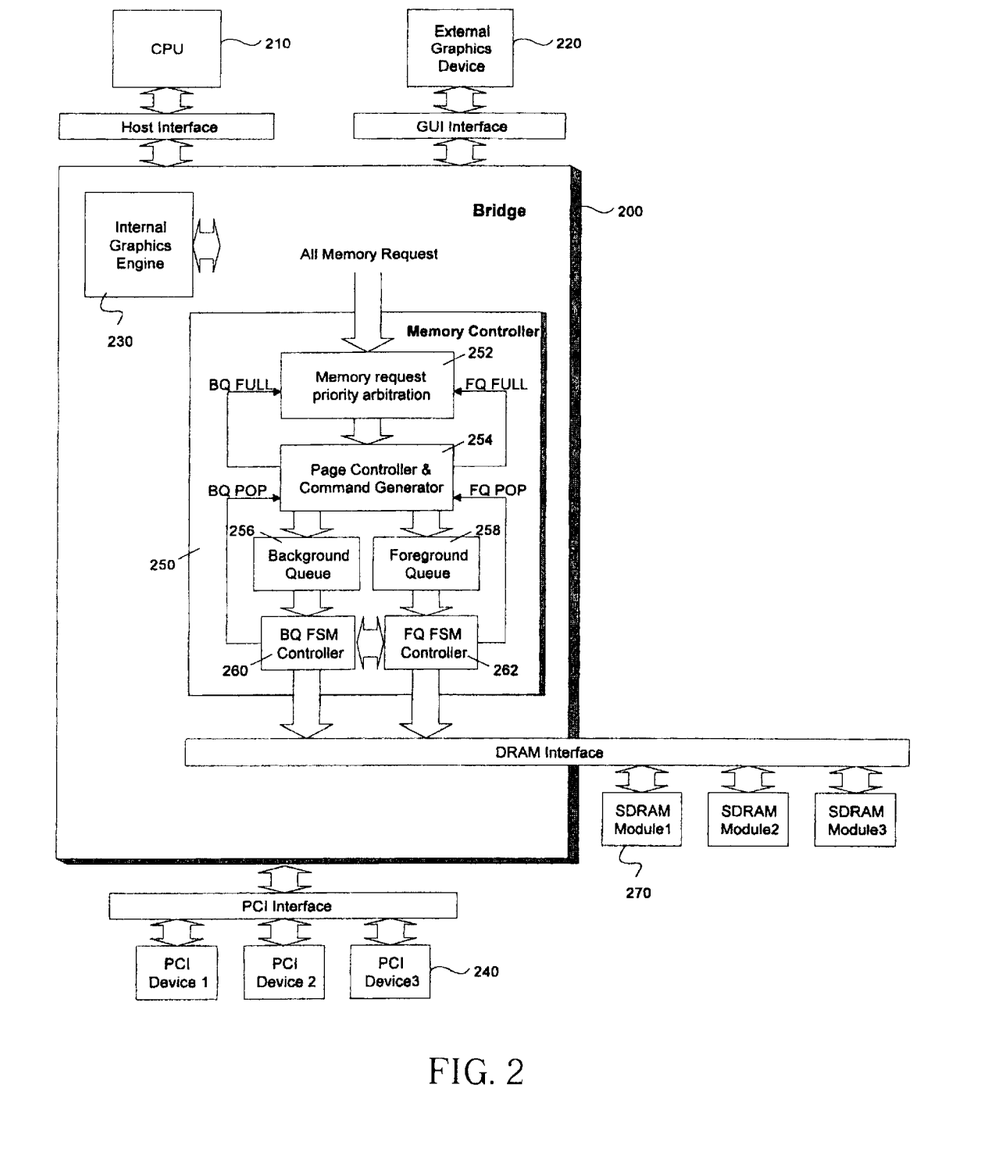
FIG. 2 depicts a functional block diagram shows the architecture of the invention.

FIG. 2 shows a block diagram illustrated the system based on PC architecture according to the present invention. A bridge 200 connects a CPU 210, an external graphics device 220, PCI devices 240, and main memory 270, such as SDRAM. Wherein, a memory controller 250 is integrated in the bridge 200 to accept memory requests from other devices, such as the CPU 210, external VGA 220, internal VGA 230 and master peripheral devices. The memory controller 250 includes a memory request priority arbitration unit 252, a page controller and command generator unit 254, a background queue 256, a foreground queue 258, a background queue finite state machine (BQ FSM) controller 260 and a foreground queue finite state machine (FQ FSM) controller 262. The interconnection between those units are illustrated in FIG. 2

The memory request priority arbitration unit 252 is employed to determine the priority of all requests to guarantee the requests could meet latency requirement, wherein the priority of requests must be well arranged according to the characteristics of requests and bandwidth requirement. After determining the priority of requests, the granted request is sent to page controller and command generator unit 254.

There are two major functions about the page controller and command generator unit 254, including determining whether the current request is a hit cycle or a miss cycle and then generating proper memory commands accordingly and decoding row address and column address. Since the SDRAM 270 supports Ping-Pong bank access, that is a bank can be activated or pre-charged while another bank is being accessed, adopting to this feature, all memory commands are classified into two categories, including background command and foreground command, as data related or not. The background commands include a MRS(mode register set) command, an ACT(activate) command, a PRE(pre-charge) command and a REF(refresh) command, while the foreground commands include a RD(read) command and a WRT(write) command. Consequently, the commands are sent into the background queue (BQ) and the foreground queue (FQ) depending on the command type. Since the MRS command and the REF command are only performed at system boots up and periodical refresh cycle, only the relationship between the ACT, PRE, RD and WRT commands are illustrated in this specification.

When constrains required for the being consumed command in the FQ or BQ are all satisfied, the background FSM or the foreground FSM issues commands onto DRAM bus at first allowable time accordingly. Moreover, the background commands can be overlapped with the foreground commands as long as the commands meet the required constrains.

Figure 3:
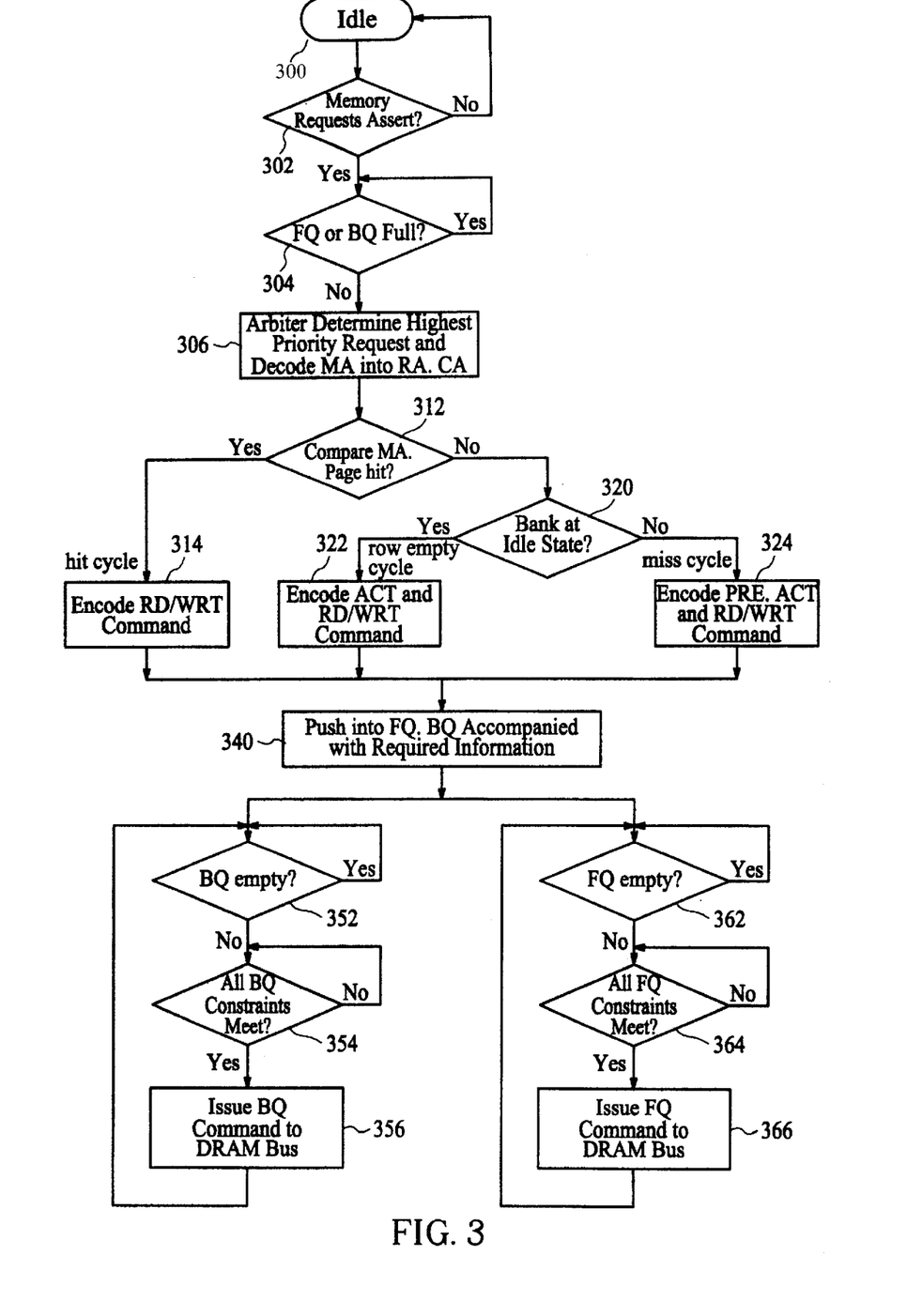
FIG. 3 depicts a flow chart of the invention.

The control flow of the memory controller according to the present invention is illustrated in FIG. 3. The steps are followings:

Step 300: Idle state.

Step 302: Detect whether there are any memory requests. If memory requests are asserted, jump to step 304; otherwise jump back to idle state.

Step 304: Detect whether the FQ 258 or the BQ 256 is full. If the FQ 258 or the BQ 256 is full, repeat this step until the related FSM controller 260 or 262 pops pointed entry; otherwise jump to step 306.

Step 306: Determine the highest priority request by the priority arbitration unit 252 and decode the Memory Address into row address RA and column address CA. Jump to step 312.

Step 312: Compare the address with the latched row address to determine if it is a page hit cycle or not. If it is a hit cycle, jump to step 314, otherwise jump to step 320 and update the latched address and status.

Step 314: Encode commands, including RD/WRT commands, and jump to step 340.

Step 320: Detect if the desired bank is at idle state. If the desired bank is in idle state, that is a row empty cycle, jump to step 322; otherwise, a miss cycle, jump to step 324.

Step 322: Encode commands, including ACT and RD/WRT commands, then jump to step 340.

Step 324: Encode commands, including PRE, ACT, and RD/WRT commands, then jump to step 340.

Step 340: Push all the generated commands, row address RA and column address CA into corresponding FQ 258 and BQ 256 accompanying with required information, such as bank information, cycle ID, ordering ID, ordering flag and access length, etc. Then execute step 352 and step 362 simultaneously.

Step 352: Detect if the BQ 256 is empty. If the BQ 256 is empty, then repeat this step; otherwise jump to step 354.

Step 354: Detect if all BQ constrains are met. If so, then jump to step 356; otherwise repeat this step.

Step 356: Issue the BQ command onto DRAM Bus, and jump back to step 352.

Step 362: Detect if the FQ 258 is empty. If the FQ 258 is empty, then repeat this step; otherwise jump to step 364.

Step 364: Detect if all FQ constrains are met. If so, then jump to step 366; otherwise repeat this step.

Step 366: Issue the FQ command onto DRAM Bus, and jump back to step 362.

In the step 356 and step 366, the background and foreground FSM controller manages when to issue commands onto DRAM bus. Both of the background and foreground FSM controllers issue memory commands to DRAM bus immediately and respectively when the following conditions are satisfied.

Figure 4:
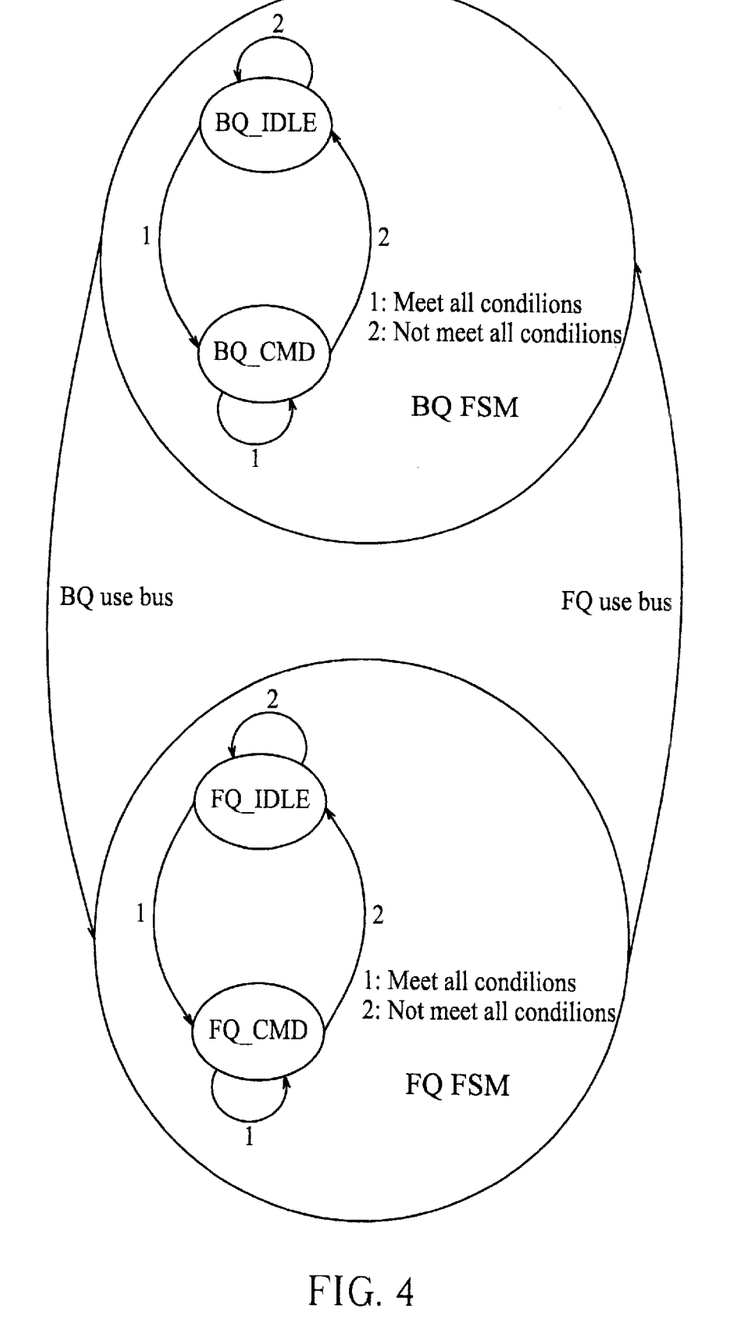
FIG. 4 is a state diagram depicting a finite state machine of background queue and foreground queue.

The requires constraints for a background command are:
1. Background queue is not empty. If the background queue is empty, BQ FSM stays at idle state.
2. All related SDRAM AC timing constrains for this being consumed background command are met. For example, to issue a pre-charge command, tRAS(ACT to PRE period) and tWR(write recovery time) must be met. The requirement is depended on command type.
3. The command bus is available at destined rising clock edge. . When a background command is going to be issued onto DRAM interface, the command bus can not be occupied by foreground FSM at the destined rising clock edge.
4. If the being consumed background command is a pre-charge command, it can not terminate the useful ongoing data transfer. Since a pre-charge command can terminate a read or a write cycle, before issuing a PRE command, the page going to be pre-charged must already complete useful data transfer for preceding read or write access.
5. If the being consumed background command is a pre-charge command, the ordering management must be met.

The requires constraints for a foreground command are:
1. Foreground queue is not empty. If the foreground queue is empty, FQ FSM stays at idle state.
2. All related SDRAM AC timing constrains for this being consumed foreground command are met. For example, to issue a read/write command, tRCD(ACT to RD/WRT delay time) must be met. The requirement is depended on command type.
3. The command bus and data bus are available at destined rising clock edge. When a foreground command is going to be issued onto DRAM interface, the command bus can not be occupied by background FSM at the destined rising clock edge. Moreover, data bus must be free at the desired time interval for a foreground command to transfer read or write data.
4. Since a RD/WRT command can terminate preceding read or write cycle, the being consumed foreground command can not terminate preceding useful ongoing data transfer.

Since ordering problem may cause incorrect DRAM operation, the ordering management according to the present invention is described hereinafter. The background commands are not data related; therefore, they could be issued during the interval that data bus is busy but command bus is free; i.e. background commands can be overlapped with foreground commands, that is background FSM and foreground FSM pipelined issue commands onto DRAM bus. Under certain condition, the background commands may not be executed in advance or the foreground command may not work correctly. Therefore, ordering checking for queued foreground commands is required before issuing a background command.

The ordering management according to the present invention is illustrated as followed. As a memory request generated, then an incremental cycle ID is given to the request. After the related commands decoded, the commands are all identified with the same cycle ID when pushed into queues no matter background command or foreground command they are. When the ordering problem happened, that is when we try to pre-charge an activated page that is going to be accessed by a queued foreground read/write command, the ordering flag must be set and ordering ID, must be recorded when the background command is pushed into BQ.

The ordering ID is equivalent to the largest cycle ID of the queued foreground commands which accesses the same bank as the being pushed pre-charge command. Thus, the background command accompanied with valid ordering flag can not be issued until the pointed FQ command cycle ID is larger than the ordering ID of the background command.

For example, a memory access consists of three cycles and the FQ and BQ are empty at the beginning. There are cycle 1 which is a hit write cycle on bank A, cycle 2 which is a hit read cycle on bank A, and cycle 3 which is a miss write cycle on bank A. The FQ 258 and BQ 256 are formed as table 1. Since cycle 1 and cycle 2 are hit cycles,. WRT and RD command are encoded immediately and are pushed into FQ entry 1 and entry 2. However, cycle 3 is a miss cycle and the generated commands are PRE bank A, ACT bank A and WRT. Wherein the PRE bank A and the ACT bank A are pushed into BQ entry 1 while the WRT bank A is pushed into FQ entry 3.

In this case, the BQ entry 1 can not be performed before the FQ entry 2 (cycle 2) is completed. Otherwise, cycle 2 reads the data from undesired page (activated by BQ entry 1, cycle 3). However, if we do not consider this kind of ordering problem, the PRE bank A and the ACT bank A may be issued right after the completion of the FQ entry 1 since all constraints for BQ entry 1 are satisfied at that moment. Therefore, before issuing a PRE command, ordering checking mechanism for all queued foreground commands is required. The present invention implies three extra data in queue entries, including a cycle ID, an ordering ID and an ordering flag, to solve ordering problem. In the case, the PRE command for cycle 3 is accompanied with a valid ordering flag and ordering ID 2 when pushed into background queue. Even though all constraints are satisfied, this PRE command can not be issued before foreground command with cycle ID 2 is completed. Using this simple mechanism, the ordering problem can be solved.

TABLE 1

A BQ and FQ ordering example

| Queue Entry | B.Q. | F.Q. | Memory Access | Cycle ID |
|---|---|---|---|---|
| 3 | | WRT A | Bank A miss write | 3 |
| 2 | | RD A | Bank A hit read | 2 |
| 1 | PRE A, ACT A (2) | WRT A | Bank A hit write | 1 |
| 0 | — | — | Preceding access | — |

Figure 5A:
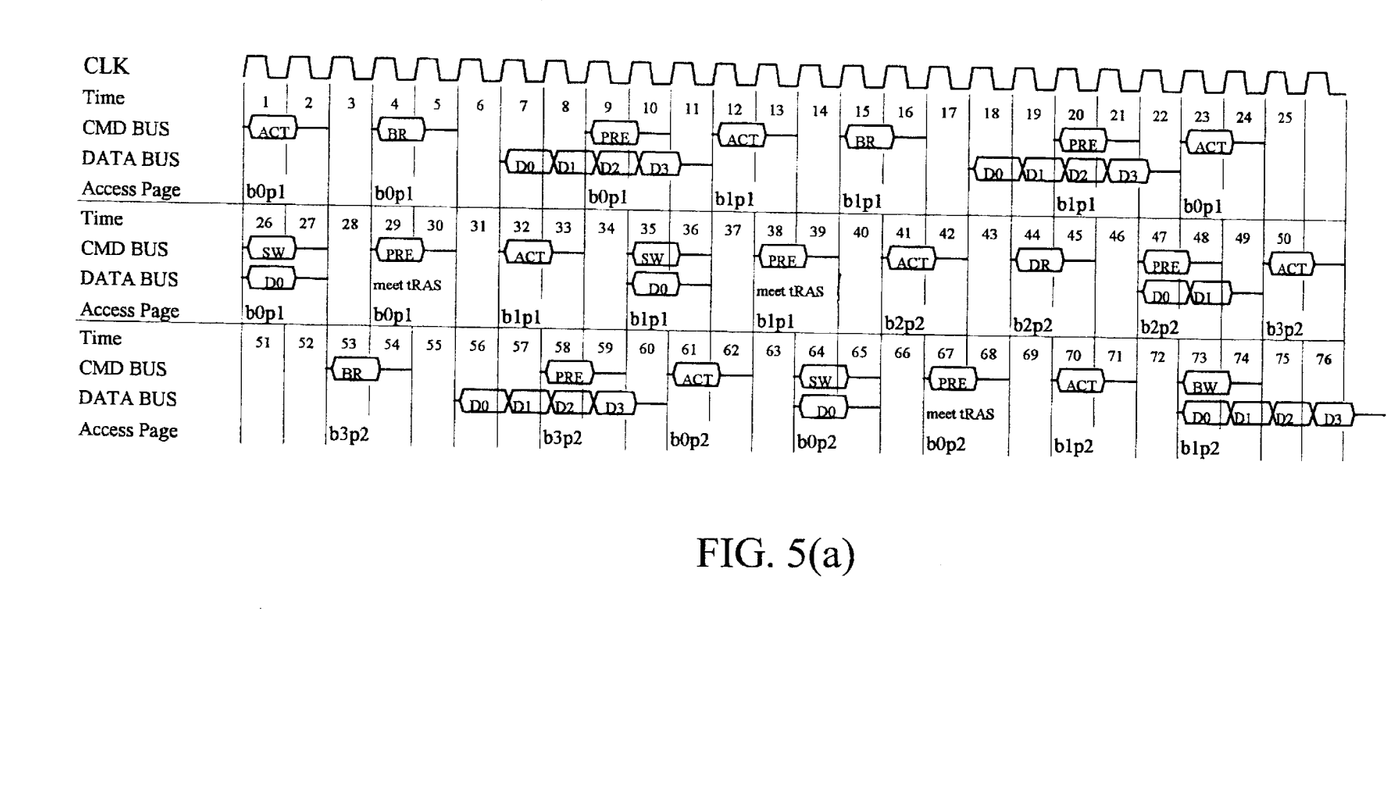
FIG. 5(a) is a timing diagram illustrating the performance according to the conventional method.
Figure 5B:
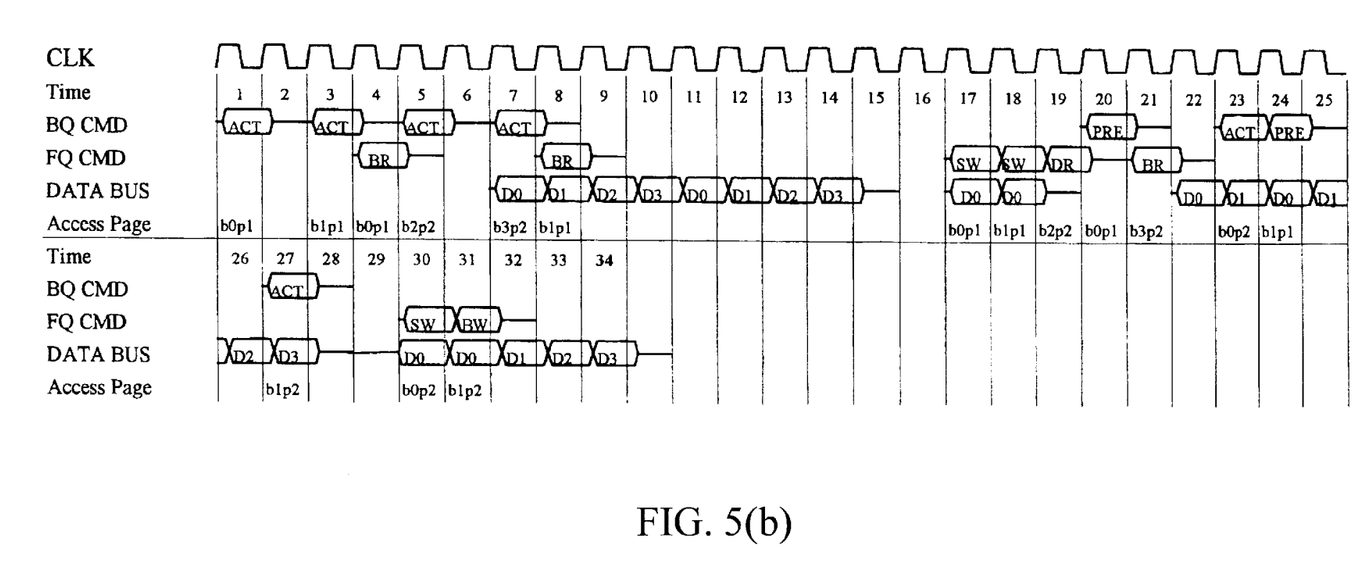
FIG. 5(b) is a timing diagram illustrating the performance according to the present invention.

There is a simple performance comparison on DRAM bus between the conventional memory control method and the present invention, as shown in FIGS. 5(a) and 5(b). FIG. 5(a) is a timing diagram illustrating operation of SDRAM based on conventional method, which does not support Ping-Pong bank access and only one active bank. FIG. 5(b) is a timing diagram illustrating operation of SDRAM based on the present invention method, which supports Ping-Pong bank access and multiple active banks. There are eight memory cycles in the request sequence, including burst read on bank 0 row 1(BR(b0p1)), burst read on bank 1 row 1(BR(b1p1)), single:write on bank 0 row 1(SW(b0p1)), single write on bank 1 row 1(SW(b1p1)), double read on bank 2 row 2(DR(b2p2)), burst read on bank 3 row 2(BR (b3p2)), single write on bank 0 row 2(SW(b0p2)), and burst write on bank 1 row 2(BW(b1p2)). The AC timing constrains are: CL(CAS latency) is 3T, tRAS(ACT to PRE period) is 6T, tRP(PRE to ACT period) is 3T, tRCD(ACT to RD/WRT delay time) is 3T and tRRD(ACT to ACT period) is 2T.

As shown in FIG. 5(a), in the timing diagram according to conventional method, the all necessary commands are 8 ACT commands, 7 PRE commands, 3 BR commands, 3 SW commands, 1 DR and 1 BW commands. It takes total 76T to complete the request sequence. Since the conventional method supports only one active bank and no Ping-Pong access, the commands are executed step by step according to the AC timing constrains.

As shown in FIG. 5(b), the necessary commands are 6 ACT commands, 2 PRE commands, 3 BR commands, 3 SW commands, 1 DR command and 1 BW command. Since the method supports multiple active banks and Ping-Pong access, the request sequence can be classified as hit cycle, miss cycle and row empty cycle. There is no necessary to issue PRE and ACT commands in hit cycle and PRE command in idle-state page; therefore only 2 PRE and 6 ACT commands are needed. In addition, all commands are accompanied with a cycle ID, and the background command PRE(7) is accompanied with an ordering flag and an ordering ID 3, and the background command PRE(8) is accompanied with an ordering flag and an ordering ID 4. Those two background commands can not be issued before relative foreground command with cycle ID 3 and 4.

The memory access has eight cycles, including cycle 1 which is a row empty read cycle on bank 0, cycle 2 which is a row empty read on bank 1, cycle 3 which is a hit write on bank 0, cycle 4 which is a hit write on bank 1, cycle 5 which is a row empty read on bank 2, cycle 6 which is a row empty read on bank 3, cycle 7 which is a miss write on bank 0, and cycle 8 which is a miss write on bank 1. After commands are generated, the FQ and BQ are formed as table 2.

In the present invention method, it only takes 34T to complete the request sequence. The bus utility is enhanced because of the pipelined issue commands, activate and pre-charge commands are overlapped with on going data transfer.

TABLE 2 a BQ and FQ ordering example

| Queue Entry | B.Q. | F.Q. | Memory Access | Cycle ID |
|---|---|---|---|---|
| 8 | | BW(b1p2) | Bank 1 miss write | 8 |
| 7 | | SW(b0p2) | Bank 0 miss write | 7 |
| 6 | PRE(4).ACT(b1p2) | BR(b3p2) | Bank 3 row empty read | 6 |
| 5 | PRE(3).ACT(b0p2) | DR(b2p2) | Bank 2 row empty read | 5 |
| 4 | ACT(b3p2) | SW(b1p1) | Bank 1 hit write | 4 |
| 3 | ACT(b2p2) | SW(b0p1) | Bank 0 hit write | 3 |
| 2 | ACT(b1p1) | BR(b1p1) | Bank 1 row empty read | 2 |
| 1 | ACT(b0p1) | BR(b0p1) | Bank 0 row empty read | 1 |
| 0 | — | — | Preceding access | — |

It should be understood that various alternatives to the structures described herein may be employed in practicing the present invention. It is intended that the following claims define the invention and that the structure within the scope of these claims and their equivalents be covered thereby.

While this invention has been described with reference to an illustrative example, this description is not intended to construe in a limiting sense. Various modifications and combinations of the illustrative embodiment, as well as other embodiments of the invention, will be apparent to persons skilled in the art upon reference to the description. It is therefore intended that the appended claims encompass any such modifications or embodiments.

What is claimed is:

1. A pipelined SDRAM memory control method to optimize DRAM bus utilization, comprising the steps of:

selecting a request with highest priority as a granted request by a priority arbitration unit when memory requests are asserted;

decoding address of said granted request into a row address and a column address;

generating an incremental cycle ID;

generating proper commands for said granted request and classifying the commands into background commands and foreground commands;

assigning said incremental cycle ID to every said granted request;

pushing the background commands and the foreground commands accompanied with required information into a background queue and a foreground queue, respectively; and issuing a pointed background command when background conditions are satisfied or a pointed foreground command when foreground conditions are satisfied onto command-bus in a pipelined way;

wherein said required information includes said row address, said column address, said cycle ID, an ordering ID, an ordering flag, bank information, and access length, and wherein said ordering flag is set valid when one of said pushed background commands pre-charge an activated page and said activated page is accessed by at least one foreground command in the foreground queue whose cycle ID is smaller than said ordering ID of one of said pushed background commands.

2. The pipelined SDRAM memory control method of claim 1, wherein said cycle ID assigned to said granted request is assigned to both of background commands and foreground commands which are classified from the commands generated for said granted request.

3. A pipelined SDRAM memory controller to optimize DRAM bus utilization, comprising:

a priority arbitration unit for receiving requests from devices and determining the priority for said requests to send a granted request with highest priority;

a page controller for receiving said granted request and monitoring DRAM module internal state;

a command generator for generating background commands and foreground commands based on said granted request received by said page controller and generating required information;

a background queue for storing said background commands and said required information;

a foreground queue for storing said foreground commands and said required information;

a background finite state machine controller for issuing a pointed background command from said background queue onto DRAM interface when background conditions are satisfied; and a foreground finite state machine controller for issuing a pointed foreground command from said foreground queue onto DRAM interface when foreground conditions are satisfied;

wherein said required information includes a row address, a column address, bank information, access length, a cycle ID, an ordering ID, and an ordering flag, and wherein said background conditions are that, said background queue is not empty;

said command bus is not occupied by a foreground command;

all DRAM AC timing for said background command are met;

the pointed background command does not terminate the useful ongoing data transfer; and if the pointed background command accompanied with valid ordering flag, the pointed background command meets an ordering management, and wherein said ordering criterion is that the pointed background command with valid ordering flag is issued only when the cycle ID of the pointed foreground command is larger than the ordering ID of the pointed background command.

4. A pipelined SDRAM memory control method to optimize DRAM bus utilization, comprising the steps of:

selecting a request with highest priority as a granted request by a priority arbitration unit when memory requests are asserted;

decoding address of said granted request into a row address and a column address;

generating an incremental cycle ID;

generating proper commands for said granted request and classifying the commands into background commands and foreground commands;

assigning said incremental cycle ID to every said granted request;

pushing the background commands and the foreground commands accompanied with required information into a background queue and a foreground queue, respectively; and issuing a pointed background command when background conditions are satisfied or a pointed foreground command when foreground conditions are satisfied onto command bus in a pipelined way;

wherein said required information includes said row address, said column address, said cycle ID, an ordering ID, an ordering flag, bank information, and access length, and wherein said ordering ID is generated for said background commands which are classified from the commands and the pointed background command is issued when said ordering ID is equal to the largest cycle ID of said foreground commands stored in said foreground queue, and wherein said background conditions are that:
   said background queue is not empty;
   said command bus is not occupied by a foreground command;
   all DRAM AC timing for said background command are met;
   the pointed background command does not terminate the useful ongoing data transfer; and
   if the pointed background command accompanied with valid ordering flag, the pointed background command meets an ordering criterion, and wherein said ordering criterion is that the pointed background command with valid ordering ID is issued only when the cycle ID of the pointed foreground command is larger than the ordering ID of said pointed background command.

5. The pipelined SDRAM memory control method of claim 4, wherein said cycle ID assigned to said granted request is assigned to both of background commands and foreground commands which are classified from the commands generated for said granted request.

6. The pipelined SDRAM memory controller of claim 3, wherein said cycle ID assigned to said granted request is assigned to both of the background commands and the foreground commands generated for said granted request.

* * * * *